(12) United States Patent
Ogata

(10) Patent No.: US 6,532,928 B2
(45) Date of Patent: Mar. 18, 2003

(54) INTAKE MANIFOLD FOR VEHICLE, AND PROCESS FOR PRODUCING THE SAME

(75) Inventor: Shuji Ogata, Miyagi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 09/943,261

(22) Filed: Aug. 30, 2001

(65) Prior Publication Data

US 2002/0046725 A1 Apr. 25, 2002

(30) Foreign Application Priority Data

Aug. 31, 2000 (JP) ........................ 2000-268398

(51) Int. Cl.⁷ .............................................. F02M 35/10
(52) U.S. Cl. .................................................. 123/184.61
(58) Field of Search ....................... 123/184.61, 184.21, 123/184.57, 184.47

(56) References Cited

FOREIGN PATENT DOCUMENTS

| EP | 0 568 560 B1 | 11/1993 |
|---|---|---|
| GB | 2279035 A * | 12/1994 |
| JP | 5-177712 | 7/1993 |

OTHER PUBLICATIONS

WO 97/15755, Title: Intake Pipe.

* cited by examiner

*Primary Examiner*—Gene Mancene
*Assistant Examiner*—Hyder Ali
(74) *Attorney, Agent, or Firm*—Rankin, Hill, Porter & Clark LLP

(57) ABSTRACT

In an intake manifold for a vehicle, including a plurality of branch pipes connected at their one ends to a surge tank, bent at substantially 90 degrees, and horizontally arranged in parallel to one another, and an engine mounting flange connected to the other ends of the branch pipes, particularly in that including a pair of joining members made of a synthetic resin and welded to each other, among welding margins set before welding in at least one joining member along a joining line, the welding margin in a pressing direction for a portion corresponding to an inclined portion is set larger than the welding margin in the pressing direction for the remaining zone excluding the inclined portion of the joining line.

5 Claims, 8 Drawing Sheets

INTAKE MANIFOLD FOR VEHICLE, AND PROCESS FOR PRODUCING THE SAME

BACKGROUND OF THE INVENTION

1. Field of the Invention

The present invention relates to an intake manifold for a vehicle, including a plurality of branch pipes each of which is commonly connected at one end thereof to a surge tank and each of which has such a shape that is bent at substantially 90 degrees as a projected figure on a vertical plane, said branch pipes being arranged in parallel to one another in a horizontal direction, and an engine mounting flange which is connected commonly with the other end of each of the branch pipes, and in particular, to an improvement in a welded and joined structure in an intake manifold for a vehicle, having a pair of joining members made of synthetic resin and welded to each other, as well as to a process for producing an intake manifold for a vehicle, having an improved welded and joined structure.

2. Description of the Related Art

Such an intake manifold for a vehicle is already known, for example, from Publication WO97/15755 and the like.

It is required that each of joint zones of an intake manifold for a vehicle, which is comprised of a plurality of joining members made of a synthetic resin welded together, have a joining strength sufficient to withstand an internal pressure. Moreover, it is required that a sufficient joining strength and rigidity be maintained at joint zones in the vicinity of an engine mounting flange in consideration of the disposition of a fuel rail and the like at a location near the flange.

On the other hand, it is a conventional widely employed practice to establish a welding margin substantially equally over the entire length of a joining line, when joining members made of a synthetic resin are to be welded to each other. Particularly, it is already known, for example, from European Patent Publication No. EP-0568560B1 and Japanese Patent Application Laid-open No.5-177712 and the like that a joining line having not only a plane surface perpendicular to the pressing direction during welding but also an inclined portion and a curved portion, enables the welding time to be shortened to thereby enhance the efficiency.

Therefore, an intake manifold for a vehicle has been made, including a plurality of branch pipes each of which is commonly connected at one end thereof to a surge tank and each of which has such a shape that is bent at substantially 90 degrees as a projected figure on a vertical plane, said branch pipes being arranged in parallel to one another in a horizontal direction, and an engine mounting flange which is connected commonly with the other ends of the branch pipes, in which a first joining member made of a synthetic resin and integrally provided with the engine mounting flange to constitute a portion of each of the branch pipes and a second joining member made of a synthetic resin and constituting the remaining portion of each branch pipe are welded to each other along a joining line extending in a loop and having an inclined portion disposed substantially half around each of the branch pipe in the vicinity of the engine mounting flange. However, the joining strength at the inclined portion of the joining line has been lower than that of other zones, and a required joining strength has not been obtained.

This is assumed to have been caused by no effective reinforcing backup being given to the inclined portion of the joining line at the time of welding. More specifically, since the inclined portion is disposed substantially half around the branch pipe so as to be inclined with respect to the pressing direction for pressing the joining members against each other at the time of welding, the arrangement is such that a pipe portion previously included in the first joining member to form the entire inner periphery of an intake passage and a part of the inclined portion are superposed one on another. Therefore, in pressing the first and second joining members against each other, it is difficult for a die to receive a portion of the first joining member corresponding to the inclined portion.

The present invention has been accomplished with such circumstance in view, and it is an object of the present invention to provide an intake manifold for a vehicle, wherein a reduction in joining strength of the portion in the vicinity of the engine mounting flange can be prevented, as well as a process for producing such an intake manifold.

To achieve the above object, according to a first feature of the present invention, there is provided an intake manifold for a vehicle, comprising a plurality of branch pipes each of which is commonly connected at one end thereof to a surge tank and each of which has such a shape that a projected figure on a vertical plane is bent at substantially 90 degrees and which are arranged in parallel to one another in a horizontal direction, an engine mounting flange which is connected commonly to the other ends of the branch pipes, a first joining member made of a synthetic resin being integrally provided with the engine mounting flange and which constituting a portion of each of the branch pipes, and a second joining member made of a synthetic resin and constituting remaining portions of the branch pipes, the first and second joining members being welded to each other along a joining line which extends in a loop and has inclined portions disposed substantially half around said branch pipes in such a manner that they are inclined with respect to a pressing direction for pressing the joining members against each other at the time of welding, wherein among welding margins set in at least one of said first and second joining members along the joining line before welding, a welding margin in the pressing direction for zones corresponding to the inclined portions is set larger than that in the pressing direction for remaining zones excluding the inclined portions of the joining line.

With the first feature of the present invention, when the first and second joining members are to be pressed against and welded to each other, those portions of the first and second joining members which correspond to the inclined portions are brought into contact with each other before other portions. Even if each of the inclined portions is flexed due to no backup being provided to the inclined portion at its portion superposed on the pipe portion included in the first joining member in the pressing direction, the inclined portion is welded earlier or in a larger amount in correspondence to a difference in the welding margin in the pressing direction between the inclined portions and the other zones. Thus, when a predetermined amount of welding has been completed in the other zones, the amount of inclined portions welded is equal to or larger than the amount of other zones welded. As a result, the joining strength can be substantially uniform over the entire joining line, or the joining strength of the inclined portions can be larger than that of the other zones, thereby preventing a reduction in joining strength of the portion in the vicinity of the engine mounting flange.

According to a second feature of the present invention, the first joining member has pipe portions which are formed to be as portions of the branch pipes at locations on the side of the engine mounting flange, and the welding margin in the pressing direction for those zones of the inclined portions of the joining line which are superposed on the pipe portions in the pressing direction, is set larger than that in the remaining zones by an amount in a range of 10 to 25 %. With such arrangement, it is possible to reliably prevent a reduction in joining strength of the portion in the vicinity of the engine mounting flange and to avoid the time required for the welding being prolonged, and the amount of protruding molten resin n being increased. Specifically if the amount is lower than 10%, the amount of inclined portions flexed is larger than the difference between the joining margins and thus, an actual welding margin in the inclined portions is smaller than that in the other zones, resulting in a reduced joining strength of the portion in the vicinity of the engine mounting flange. If the amount exceeds 25%, not only the time required for the welding is prolonged wastefully, but also the amount of protruding molten resin produced by the welding is increased.

Alternatively, the welding margin for not only those portions of the inclined portions which are superposed on the pipe portion included in the first joining member in the pressing direction but also for the entire inclined portions may be set larger than that in the remaining zones by an amount of 10% to 25%. If the margin is set in this manner, the effect of enhancing the joining strength of the portion in the vicinity of the engine mounting flange can be further increased, and the variation in joining strength of the inclined portions can be suppressed.

According to a third feature of the present invention, in addition to the first or second feature, each of the inclined portions is inclined so that its level is lower at a position nearer to the engine mounting flange. With such arrangement, the second joining member can be supported over the entire joining line by a die on the side of the second joining member. On the other hand, it becomes difficult to support a portion of each of the inclined portions of the joining line by a die on the side of the fist joining member in order to prevent the interference with a fuel injector and a mounting portion for a fuel rail which are disposed above the engine mounting flange. However, to begin with, the present invention contemplates an intake manifold for a vehicle on the assumption that it is difficult to provide a reinforcing backup at a part of the inclined portions due to the superposition of the pipe portion included in the first joining member and the inclined portions, and the arrangement of the first or second feature makes up for the inability to support a part of the inclined portions, leading to no problem arising. Moreover, upon collision of the vehicle, the inclined portions hardly receive a damage from a member such as a fuel rail or the like disposed above the engine mounting flange.

According to a fourth feature of the present invention, there is provided a process for producing an intake manifold for a vehicle according to any one of the first to third features, comprising the steps of placing first and second joining members, so that they are sandwiched between a first die on the side of the first joining member and a second die on the side of the second joining member, with inner surfaces of their portions corresponding to the inclined portions being in non-restrained states, and pressing the first and second joining members against each other, and welding the first and second joining members in the pressed states in a vibrating manner along the joining line. With such producing process, taking into consideration that the arrangement of any of the first to third features makes it possible to avoid the reduction in joining strength of the inclined portions due to no effective reinforcing backup being given by the inclined portions of the joining line during welding, inner surfaces of those portions of the first and second joining members which correspond to the inclined portions are supported by dies and the like, thereby avoiding the complication of a mold structure to carry out vibration welding in a mold device having a simple structure as in the prior art.

DETAILED DESCRIPTION OF THE PREFERRED EMBODIMENT

The mode for carrying out the present invention will now be described by way of an embodiment shown in the accompanying drawings.

FIGS. 1 to 8B show an embodiment of the present invention.

Figure 1:
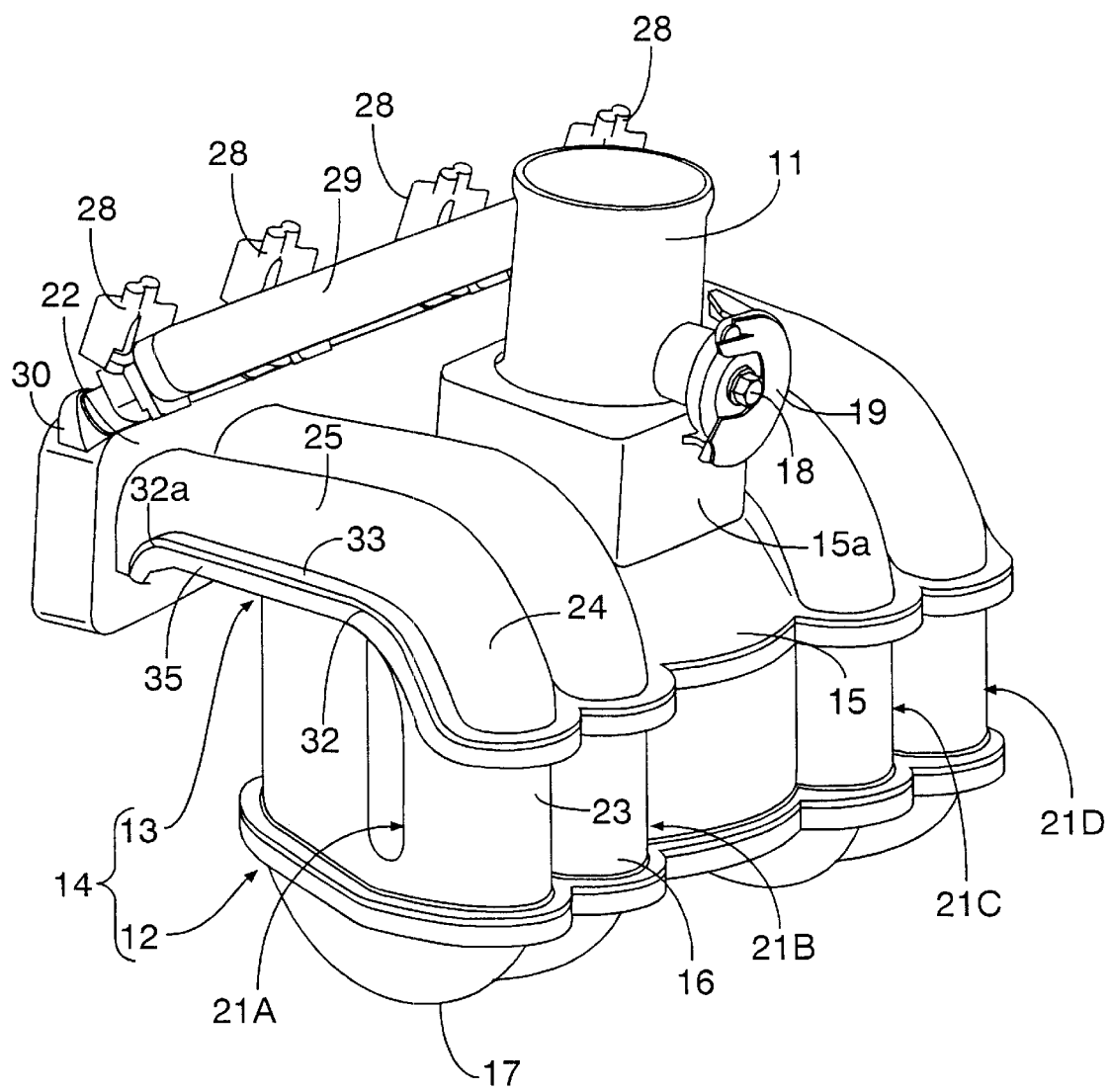
FIG. 1 is a perspective view of an intake passage structure and a throttle body.
Figure 2:
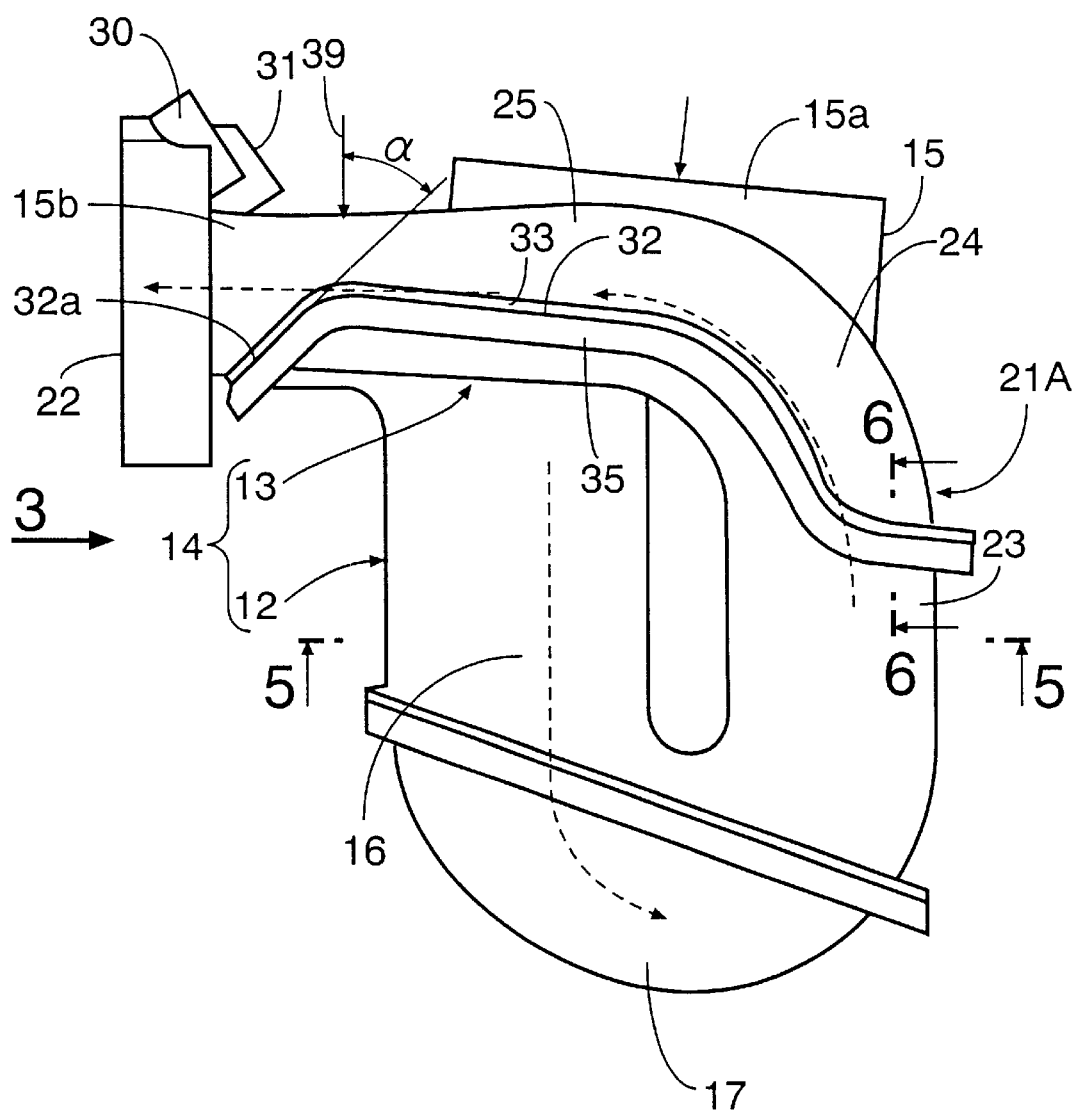
FIG. 2 is a side view of the intake passage structure.
Figure 3:
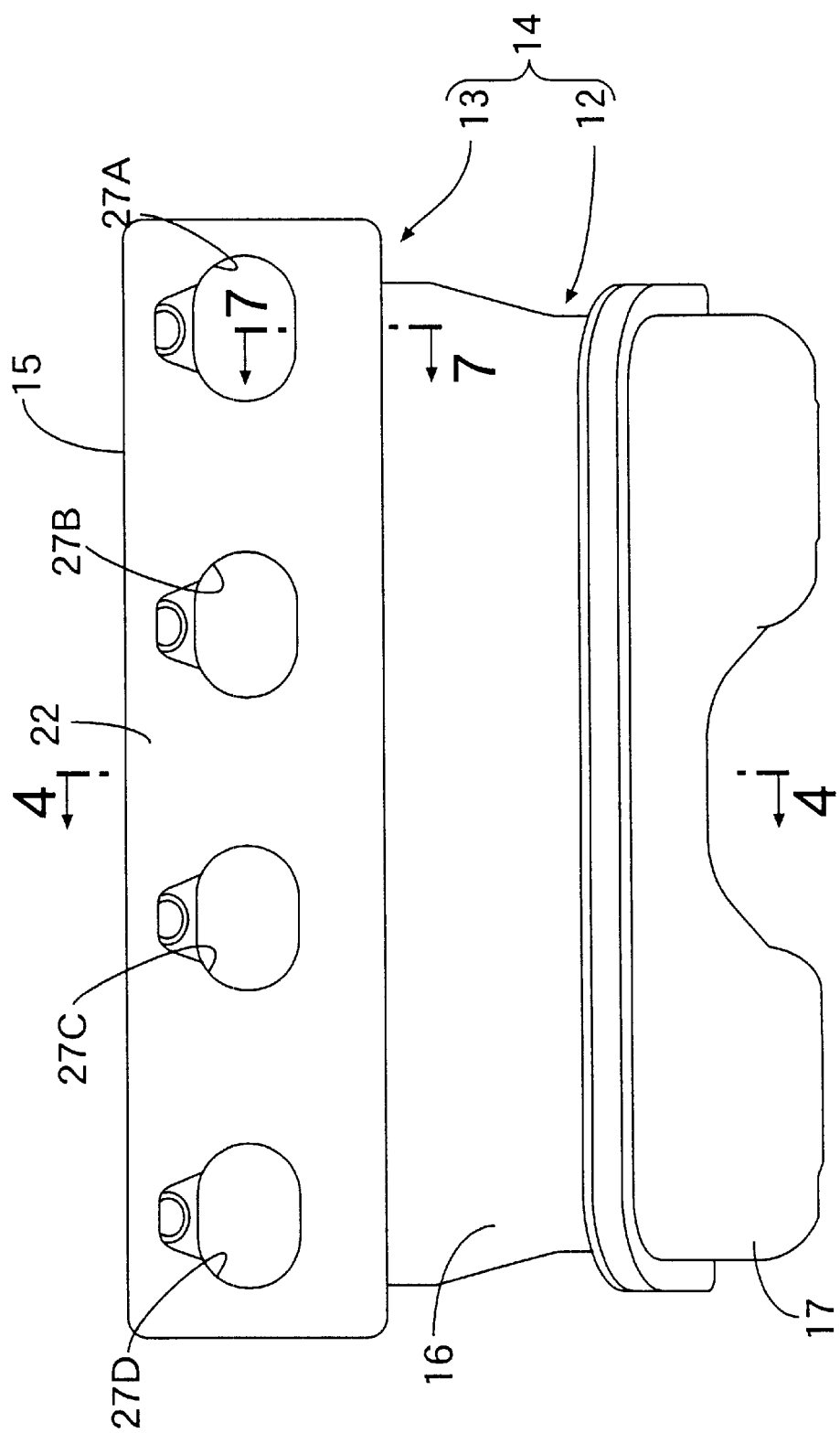
FIG. 3 is a view taken in the direction of an arrow 3 in FIG. 2.

Referring first to FIGS. 1 to 3, a throttle body 11 is mounted to an intake passage structure 14 which is integrally provided with a surge tank 12, and an intake manifold 13 which connects a four-cycle engine which is not shown and the surge tank 12 to each other. The intake passage structure 14 is constructed by vibration welding of first, second and third joining members 15, 16 and 17 made of a synthetic resin to one another.

The throttle body 11 is in the form of a vertically extending cylinder and coupled to a central portion of an upper surface of the first joining member 15. A butterfly throttle valve (not shown) for controlling the amount of flowing air is secured to a valve stem 18 which is rotatably carried on the throttle body 11, and a throttle drum 19 is mounted to an end portion of the valve stem 18 protruding from the throttle body 11.

Figure 4:
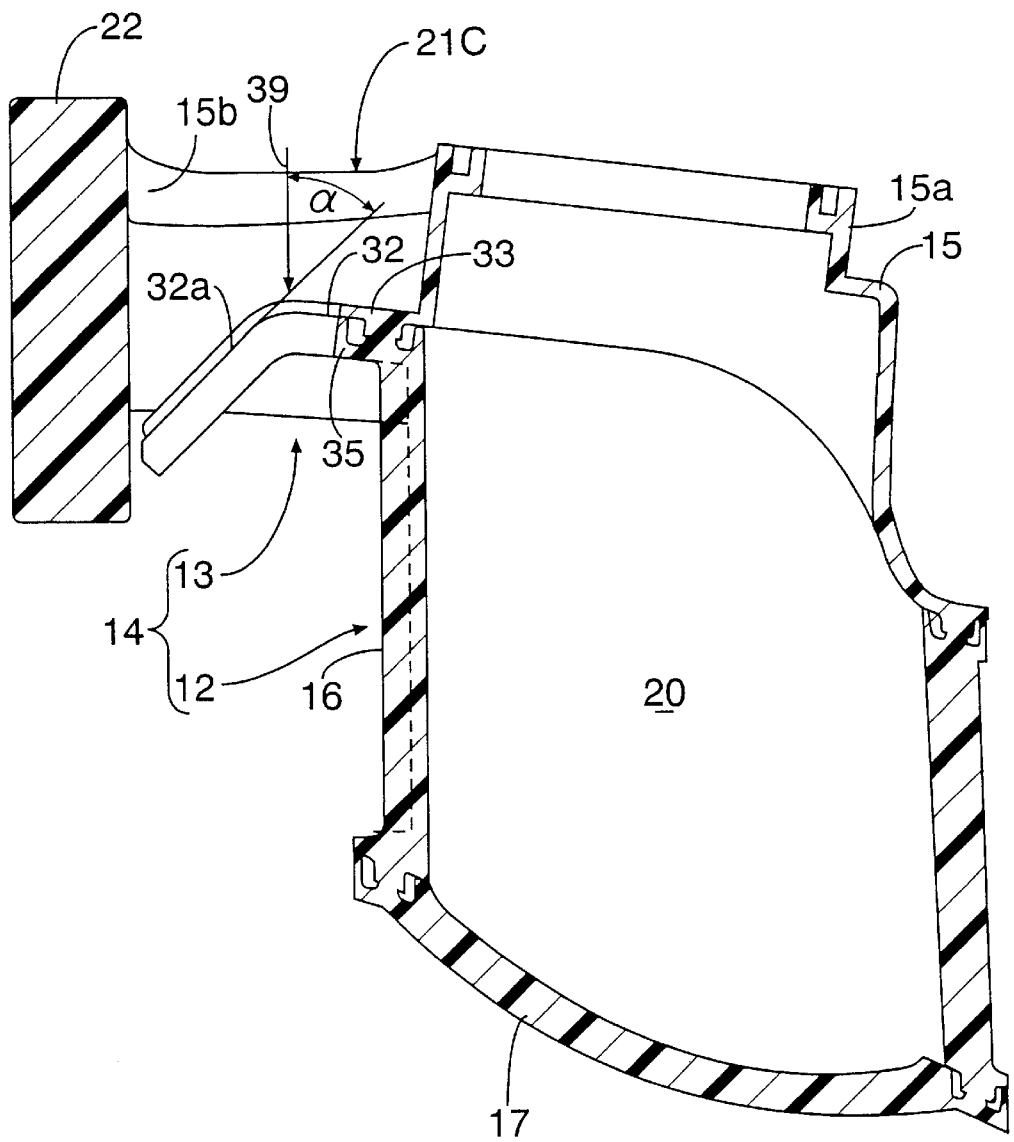
FIG. 4 is a sectional view taken along a line 4—4 in FIG. 3.
Figure 5:
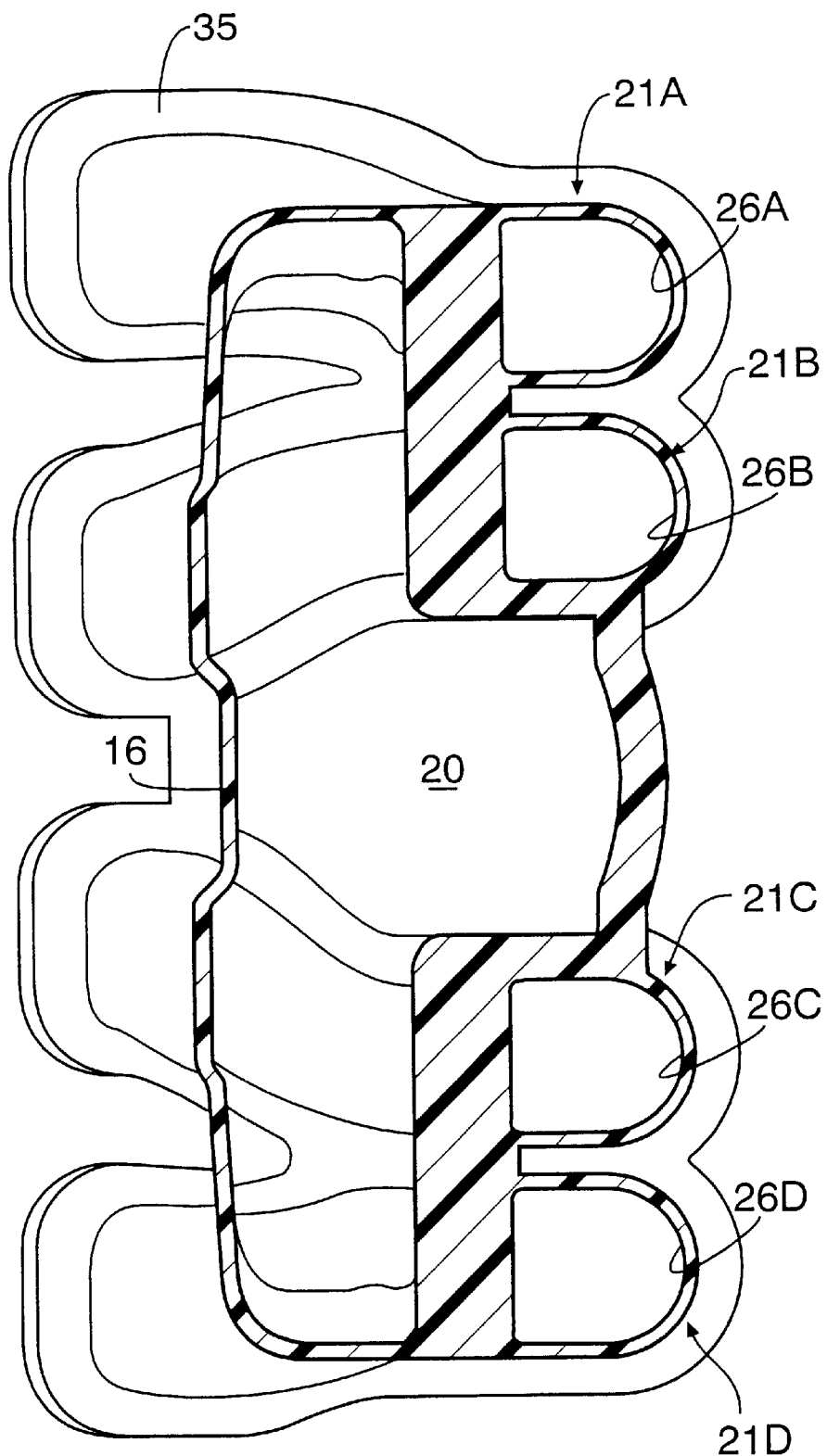
FIG. 5 is a sectional view taken by viewing a second joining member along a line 5—5 in FIG. 2.

Referring also to FIGS. 4 and 5, the first joining member 15 is integrally provided at its central portion with a connecting pipe portion 15a for coupling the throttle body 11. The surge tank 12 has an intake chamber 20 defined therein and connected to the connecting pipe portion 15a by the first, second and third joining members 15, 16 and 17.

The intake manifold 13 comprises a plurality of, e.g., four branch pipes 21A, 21B, 21C and 21D, which are disposed horizontally in parallel, for example, a pair on each of opposite sides of the throttle body 11 and the connecting pipe portion 15a, and each of which is commonly, integrally connected at one end to the surge tank 12 and at the other end to an engine mounting flange 22 for mounting the intake manifold to an engine.

The branch pipe 21A is comprised of a first straight pipe portion 23 connected at one end thereof to the surge tank 12 and rising upwards, a curved pipe portion 24 curved in a vertical plane in a range of approximately 90 degrees and connected at one end thereof to the other end of the first straight pipe portion 23, and a second straight pipe portion 25 connected at one end thereof to the other end of the curved pipe portion 24 and extending substantially horizontally. The projection view of the branch pipe 21A on the vertical plane is of such a shape that it is bent at approximately 90 degrees. Each of the other branch pipes 21B, 21C and 21D has the same basic construction as the branch pipe 21A, and each of the projection views of the branch pipes 21B, 21C and 21D on the vertical plane is also of such a shape that it is bent at approximately 90 degrees.

Intake passages 26A, 26B, 26C and 26D are defined within the branch pipes 21A, 21B, 21C and 21D, respectively, and air introduced from the throttle body 11 into the intake passage structure 14 is allowed to flow downwards in the surge tank 12 and then reversed upwards and distributed into the intake passages 26A to 26D, as shown by a broken line arrow in FIG. 2.

The air introduced into each of the intake passages 26A to 26D is allowed to flow upwards, and then turned its direction approximately 90 degrees and flows substantially horizontally toward the engine.

On the other hand, passage bores 27A, 27B, 27C and 27D permitting the communication of the intake passages 26A to 26D with intake ports (not shown) in the engine are provided in the engine mounting flange 21 in individual correspondence to the intake passages 26A to 26D. As shown in FIG. 1, fuel injectors 28 for supplying fuel to the intake ports in the engine are mounted to the engine mounting flange 22, and a fuel rail 29 is connected commonly to the fuel injectors 28. The engine mounting flange 22 is integrally provided at its upper portion with mounting portions 30 for mounting the fuel injectors 28, and mounting portions 31 (see FIG. 2) for mounting the fuel rail 29.

Such intake manifold 13 is constructed by welding the first and second joining members 15 and 16 to each other along a joining line 32 extending in a loop. The first joining member 15 is integrally provided with the engine mounting flange 22 and formed to constitute a part of each of the upper portions of the branch pipes 21A to 21D and the surge tank 12. The second joining member 16 is formed to constitute lower portions of the branch pipes 21A to 21D and a main portion of the surge tank 12.

Figure 6A:
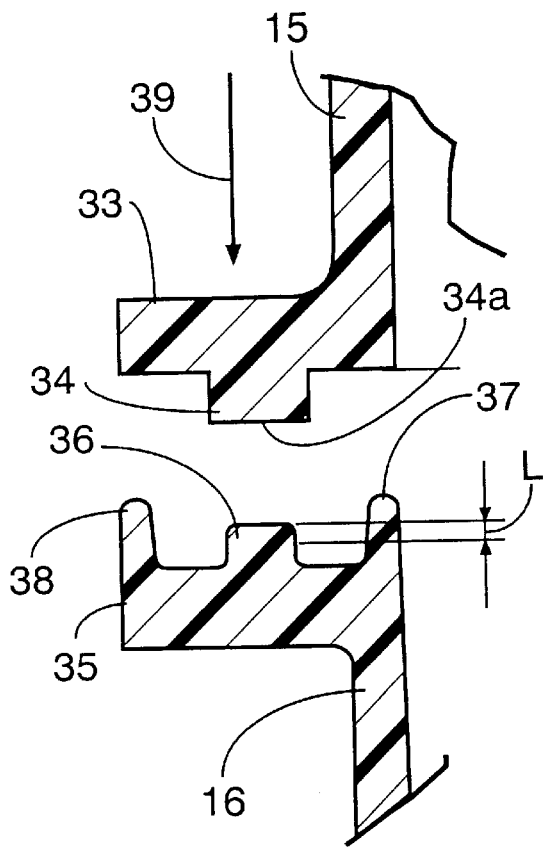
FIGS. 6A and 6B are enlarged sectional views taken along a line 6—6 in FIG. 2, FIG. 6A showing a state before welding, and FIG. 6B showing a state after welding.

In FIG. 6A, a joining flange 33 is integrally formed at a lower end of the first joining member 15 over its entire periphery to extend along the joining line 32. A protrusion 34 having a tip end surface formed as a flat joining surface 34a is integrally provided at a widthwise central portion of the joining flange 33 to protrude toward the second joining member 16.

On the other hand, a joining flange 35 is integrally formed at an upper end of the second joining member 16 over its entire periphery in an opposed relation to the joining flange 33 of the first joining member 16. A welding projection 36 corresponding to the joining surface 34a of the protrusion 34 is integrally provided at a widthwise central portion of the joining flange 35 so as to protrude towards the second joining member 15, and has a width which is set smaller than that of the protrusion 34. Limiting walls 37 and 38 are integrally provided on an entire periphery of the joining flange 35 of the second joining member 16 to protrude toward the first joining member 15 in such a manner that the welding projection 36 is sandwiched therebetween from the inside and the outside.

Figure 6B:
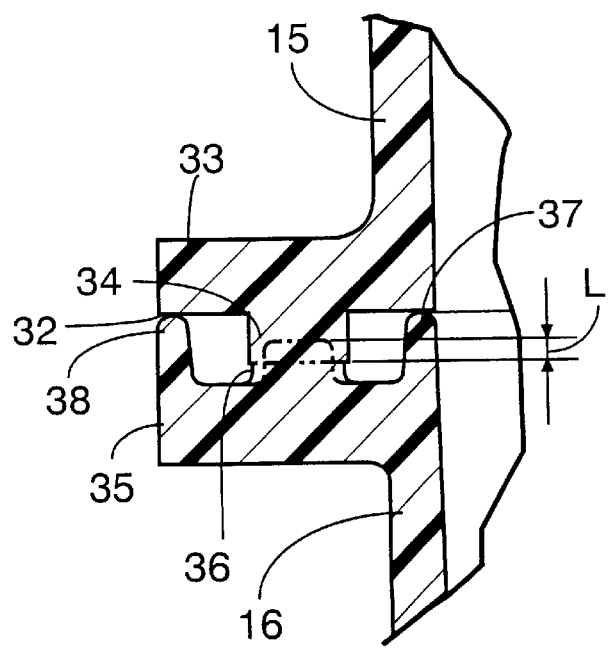

When the first and second joining members 15 and 16 are to be welded to each other, one of the first and second joining members 15 and 16, e.g., the first joining member 15 in the present embodiment, is vibrated at a high speed in a state in which the tip end of the welding projection 36 has been into pressure contact with the joining surface 34a of the protrusion 34 by pressing, for example, the first joining member 15 in a pressing direction 39 toward the second joining member 16 to press the first and second joining members 15 and 16 to each other. This causes the tip end of the welding projection 36 to be welded in a vibrated manner to the protrusion 34, as shown in FIG. 6B by a frictional heat generated between the tip end of the welding projection 36 and the joining surface 34a, whereby the entire peripheries of the first and second joining members 15 and 16 are joined to each other along the joining line 32 extending in a loop.

The limiting walls 37 and 38 of the second joining member 16 performs a function as a criterion for stopping the vibration welding process in a state in which the welding and joining of the joining members 15 and 16 have been advanced to a position in which the tip ends of the limiting walls 37 and 38 have been opposed in close proximity to the joining flange 33 of the first joining member 15, and also performs a function for preventing a protrusion of molten resin provided as a result of the vibration welding of the tip end of the welding projection 36 to the joining surface 34a from being bulged into and out of the first and second joining members 15 and 16, i.e., into and out of the intake manifold 13.

The joining line 32 for the first and second joining members 15 and 16 extends in a loop and has inclined portions 32a which are disposed substantially half around each of the branch pipes 21A to 21D in the vicinity of the engine mounting flange 22 in such a manner that it is inclined at angle α with respect to the pressing direction. Since the engine mounting flange 22 is integrally provided on the first joining member 15, each of the inclined portions 32a is inclined, so that its level is lower at a position nearer to the engine mounting flange 22.

Figure 7A:
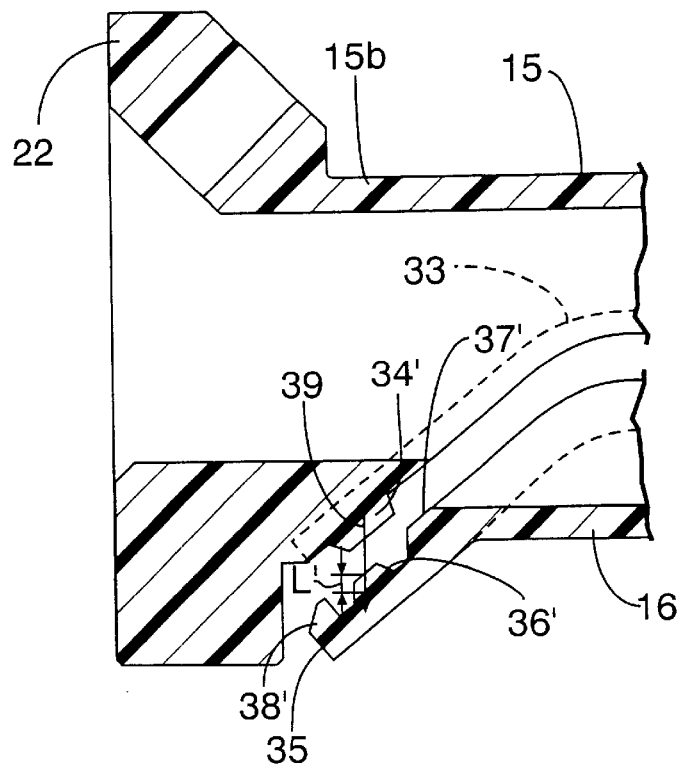
FIGS. 7A and 7B are enlarged sectional views taken along a line 7—7 in FIG. 3, FIG. 7A showing a state before welding, and FIG. 7B showing a state after welding.
Figure 7B:
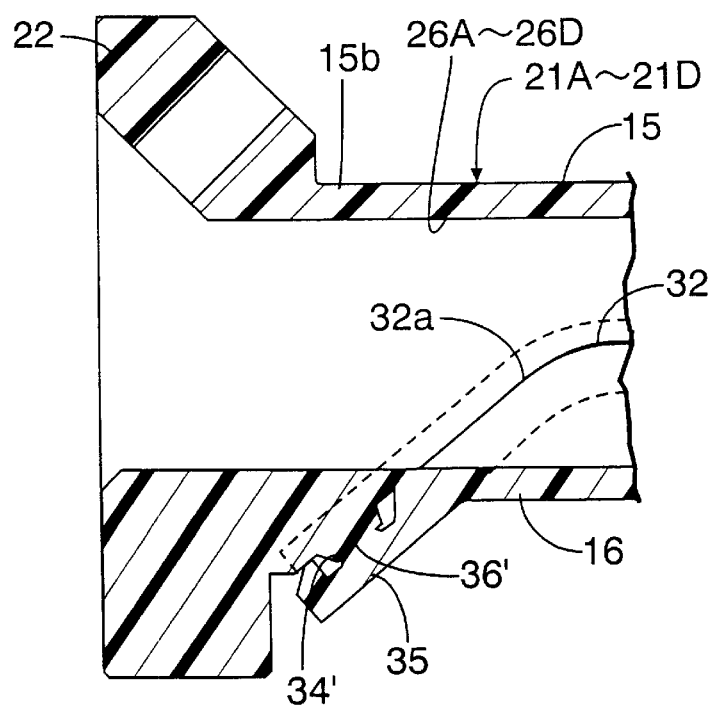

A protrusion 34' connected to the protrusion 34 is integrally provided on the first joining member 15 so as to project toward the second joining member 16, and a welding projection 36' connected to the welding projection 36 and limiting walls 37' and 38' connected to the limiting walls 37 and 38 are integrally provided on the second joining member 16 so as to project toward the first joining member 15. A tip end of the welding projection 36' is welded in a vibrated manner to the protrusion 34', as shown in FIG. 7B.

It is required that those joint zones of the first and second joining members 15 and 16 constituting the intake manifold 13, which extend along the joining line 32, have a joining strength enough to withstand an internal pressure. In addition, it is required that those portions of the joint zones, which are in the vicinity of the engine mounting flange 22, have a sufficient joining strength and rigidity maintained in view of the disposition of the fuel rail and the like in the vicinity of the flange 22. However, if the welding margin for each of the first and second joining members 15 and 16 is set to be substantially equal over the entire region of the joining line 32, the joining strength of the inclined portions 32a of the joining line 32 is lower than other portions and as a result, a necessary strength is not obtained. The reason is as follows: Since the inclined portions 32a are disposed substantially half around the branch pipes 21 in such a manner that they are inclined with respect to the pressing direction 39 for pressing the joining member 15 and 16 against each other during welding, the pipe portions 15b previously included in the first joining member 15 so as to constitute the entire inner peripheries of the intake passages 26A to 26D are superposed on parts of the inclined portions 32a with respect to the pressing direction during welding. Therefore, when the first and second joining members 15 and 16 are pressed against each other, it is difficult for portions of the first joining member 15 which correspond to the inclined portions 32a to be received by a mold, and the inclined portions 32a of the joining line 32 do not receive an effective reinforcing backup during welding.

Therefore, among the welding margins set in the welding projections 36 and 36' before the welding, a welding margin L' in the pressing direction 39 for the welding projection 36' is set larger than a welding margin L in the pressing direction 39 for the welding projection 36 in the remaining zone excluding the inclined portions 32a of the joining line 32. Thus, in pressing the first and second joining members 15 and 16 against each other for welding, those zones of the first and second joining members 15 and 16 which correspond to the inclined portions 32a are brought into contact with each other before the other zones. Therefore, if the inclined portions 32a are flexed due to no reinforcing backup received by those zones of the inclined portions 32a which are superposed on the pipe portions 15b included in the first joining member 15 in the pressing direction 39, the inclined portions 32a are welded early or in a larger amount in correspondence to a difference between margins (L'–L) in the pressing direction 39 for the zones corresponding to the inclined portions 32a and the other zones. When a predetermined amount of the welding in the other zones has been completed, the amount of inclined portions 32a welded is equal to or larger than that of the other zones. As a result, the joining strength can be substantially equivalent over the entire periphery of the joining line 32, or the joining strength of the inclined portions 32a can be larger than that of the other zones, thereby preventing a reduction in joining strength in the vicinity of the engine mounting flange 22. On the other hand, if the difference between the welding margins L' and L is too large, the time required for the welding is prolonged, and the amount of protruding molten resin is increased.

Therefore, in order to determine the difference between the welding margins L' and L in an appropriate range, an experiment was carried out, wherein the angle of inclination was set at 45° and with the difference between the welding margins L' and L was varied. Results of the experiment are shown in Table 1. This experiment was carried out using a vibratory welding machine of the type 724H made by Branson Ultrasonics Corporation at a pressing force of 2.0 MPa, at an amplitude of 240±50 Hz and using a material PA6 containing 30% of a glass fiber (which is available under a trade name of ULTRAMIDB3WG6 from BASF Aktiengesellshaft) for the first and second joining member. Mark ⊚ given in the column of synthetic judgment in Table 1 indicates that all the joining strength, the time required for the joining and the amount of protruding molten resin produced are satisfactory; X1 in Table 1 indicates that the joining strength is insufficient; and X2 indicates that at least one of the time required for the joiningand the amount of protruding molten resin produced is unsatisfactory.

TABLE 1

| (L'/L) × 100 (%) | 100 | 107 | 110 | 117 | 120 | 125 | 130 |
|---|---|---|---|---|---|---|---|
| Synthetic judgment | X1 | X1 | ⊚ | ⊚ | ⊚ | ⊚ | X2 |

α = 45 degrees

As apparent from Table 1, when the angle α of inclination of the inclined portions 32a is equal to 45 degrees and when the welding margin for the inclined portions 32a in the pressing direction is set larger than that for the remaining zones by 10 to 25%, it is possible to prevent a reduction in joining strength in the vicinity of the engine mounting flange 22 and to avoid a prolongation of the time required for the welding and an increase in amount of protruding molten resin. Specifically, if the welding margin is smaller than 10%, the amount of inclined portions 32a flexed due to no reinforcing backup is larger than the difference between the welding margins, and as a result, an actual welding margin is smaller than those in the other zones, and the joining strength of the portion in the vicinity of the engine mounting flange 22 is reduced. On the other hand, if the welding margin exceeds 25%, the time required for the welding is prolonged wastefully, and the amount of protruding molten resin produced by the welding is increased.

Moreover, zones where the reinforcing backup cannot be expected during welding, is those zones of the inclined portions 32a which are superposed on the pipe portion 15b of the first joining member 15 in the pressing direction 39. Zones where the welding margin is set larger, may be only those zones of the inclined portions 32a which are superposed on the pipe portion 15b, but the welding margin for the entire inclined portions 32a may be set larger than that in the remaining zones. If the welding margin is set in the above manner, an effect of increasing the joining strength of the portion in the vicinity of the engine mounting flange 22 can be further increased, and the variability in joining strength of the inclined portions 32a can be suppressed.

In a common vibration welding, it is preferable that the angle α of inclination is small, but in the intake manifold 13 having a shape intended by the present invention, if the angle a of inclination is smaller than 45 degrees, a limitation is generated in the arrangement of the mold during the vibration welding by the parting position and the shape for the mold release, but also.it has been confirmed in the experiment made by the present inventors that even if the difference between the welding margins is in a range of 10 to 25%, the rank in the synthetic judgment tends to be lowered. It is desirable that the angle α of inclination has a lower limit value of 45 degree.

In order to determine an upper limit value of the angle α of inclination, an experiment was carried out, wherein the angle α of inclination was set at 50 degrees and the difference between the welding margins L' and L was varied, and results of the experiment are shown in Table 2. Another experiment was carried out, wherein the an angle α of inclination was set at 60 degrees and the difference between the welding margins LF and L was varied, and results of the experiment are shown in Table 3. Mark ○ in the column of a synthetic judgment in Table 3 indicates that all of the joining strength, the time required for the joining and the amount of protruding molten resin are satisfactory but at a degree lower than mark ○.

TABLE 2

| (L'/L) × 100 (%) | 100 | 120 | 155 |
|---|---|---|---|
| Synthetic judgment | x1 | ⊙ | x2 |

α = 50 degrees

TABLE 3

| (L'/L) × 100 (%) | 100 | 120 | 155 |
|---|---|---|---|
| Synthetic judgment | x1 | ○ | x2 |

α = 60 degrees

As indicated in Tables 2 and 3, it is apparent that when the welding margin for the inclined portions 32a in the pressing direction 39 is set larger than that in the remaining zones by 10 to 25%, substantially satisfactory results are achieved in all of the joining strength, the time required for the joining and the amount of protruding molten resin produced, even if the angle α of inclination is 60 degrees. In addition, it has been confirmed by the present inventors that if the angle α of inclination exceeds 60 degrees, any one of the joining strength, the time required for the joining and the amount of protruding molten resin produced cannot be satisfactory. Therefore, it is desirable that the angle α of inclination of the inclined portions 32a is set in the range of 45 to 60 degrees.

Figure 8A:
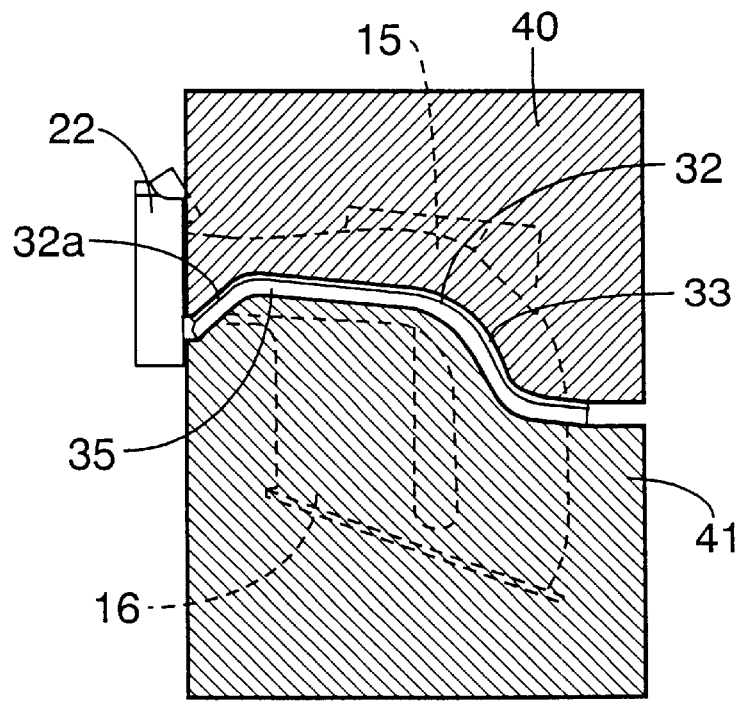
FIGS. 8A and 8B are views illustrating a course for producing the intake passage structure, FIG. 8A showing a state of production of an intake manifold, and FIG. 8B showing a state of production of the intake passage structure.

To weld and join the first and second joining members 15 and 16, a first die 40 on the side of the fist joining member 15 is vibrated, while sandwiching the first and second joining members 15 and 16 between the first mold 40 and a second die 41 on the side of the second joining member 16 and pressing them against each other, as shown in FIG. 8A, thereby welding the first and second joining members 15 and 16 in a vibrating manner along the joining line 32. In this case, the inclined portions 32a of the joining line 32 cannot receive an effective backup provided by the first die 40, but the inner surfaces of the first and second joining members 15 and 16 in the zones corresponding to the inclined portions 32a remain non-restrained without being supported by the dies or the like.

Figure 8B:
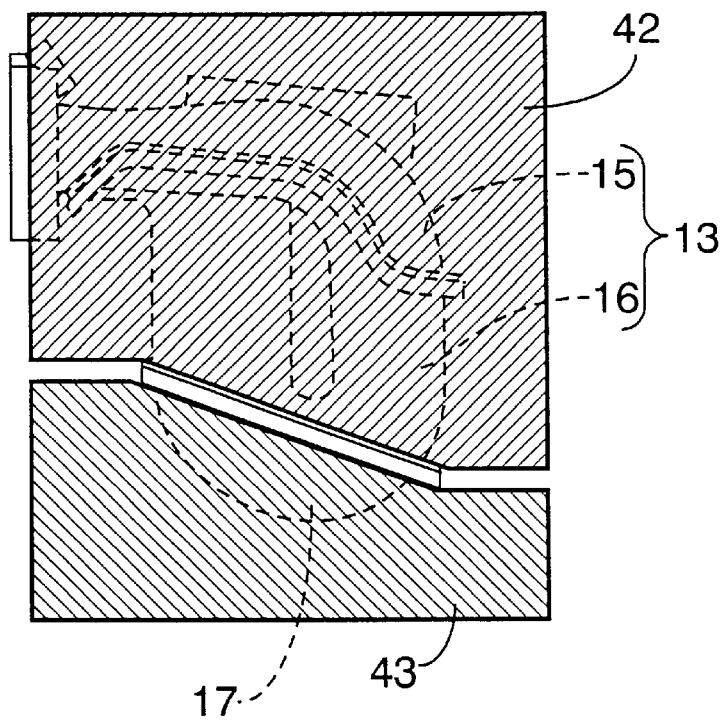

The intake manifold 13 formed by the mutual joining of the first and second joining members 15 and 16 and the third joining member 17 are welded to each other in a vibrated manner by sandwiching the intake manifold 13 and the third joining member 17 between a third die 42 on the intake manifold 13 and a fourth die 43 on the third joining member 17, and pressing them against each other, as shown in FIG. 8B, thereby completing the production of the intake passage structure 14.

The operation of this embodiment will be described below. Among the welding margins set before the welding for the first joining member 15 along the loop-shaped joining line 32, the margin L' for the zones corresponding to the inclined portions 32a in the pressing direction 39 is set larger than the welding margin L in the pressing direction 39 for the remaining zones excluding the inclined portions 32a of the joining line 32, and hence, those portions of the first and second joining members 15 and 16 which correspond to the inclined portions 32a are brought into contact with each other at the time of welding before the other zones. Therefore, even if the inclined portions 32a are flexed during welding, the inclined portions 32a are welded early or in a larger amount only by the difference (L'−L) between the margins in the pressing direction 39 for the other zones. When a predetermined amount of the welding has been completed in the other zones, the amount of inclined portions 32a welded is equal to or larger than that in the other zones. As a result, the joining strength of the inclined portions 32a can be larger that that of the other zones, thereby preventing a reduction in joining strength of the portion in the vicinity of the engine mounting flange 22.

Moreover, the pipe portions 15b which are portions of the branch portions 21A, 21B, 21C and 21D are formed on the first joining member 15 on the side of the engine mounting flange 22, and the welding margin in the pressing direction 39 for the those zones of the inclined portions 32a of the joining line 32 which are superposed on the pipe portions 15b in the pressing direction 39, is set larger than that in the remaining zones by 10% to 25%. Therefore, it is possible to reliably prevent the reduction in joining strength of the portion in the vicinity of the engine mounting flange 22, and to avoid that the time required for the welding is prolonged and the amount of protruding molten resin is increased.

In addition, since each of the inclined portions 32a is inclined, so that its level is lower at a position nearer to the engine mounting flange, the second joining member 16 can be supported over the entire periphery of the joining line 32 by the second die 41 on the side of the second joining member 16. On the other hand, it is difficult for parts of the inclined portions 32a of the joining line 32 to be supported in the first die 40 on the side of the first joining member 15 in order to prevent the interference with the mounting portions 30 and 31 for the fuel injectors 28 and the fuel rail 29 disposed above the engine mounting flange 22. However, to begin with, the present invention is intended for the intake manifold 13 for the vehicle on the assumption that the reinforcing backup is difficult in the parts of the inclined portions 32a due to the superposition of the inclined portions 32a on the pipe portions 15b included in the first joining member 15, and any inconvenience derived from that the parts of the inclined portions 32a cannot be supported can be eliminated by providing a difference between the welding margins. Moreover, the inclined portions 32a hardly receives a damage from the members such as fuel rail 29 and the like disposed above the engine mounting flange 22 upon collision of the vehicle.

Further, since the inner surfaces of those portions of the first and second joining members 15 and 16 which correspond to the inclined portions 32a are in non-restrained states, it is possible to support the inner surfaces of the portions corresponding to the inclined portions 32a by the die and the like, thereby avoiding the complication of the mold structure, and to carry out the vibration welding in a mold device having a simple structure as in the prior art.

As discussed above, according to the first feature of the present invention, when the first and second joining members are to be pressed against and welded to each other, those portions of the first and second joining members which correspond to the inclined portions are brought into contact with each other before other portions. In this manner, the inclined portions are welded more early or in a larger amount than that other portions. Thus, the joining strength can be substantially uniform over the entire joining line, or the joining strength of the inclined portions can be larger than that of the other zones, thereby preventing a reduction in joining strength of the portion in the vicinity of the engine mounting flange.

According to the second feature of the present invention, it is possible to reliably prevent a reduction in joining strength of the portion of the engine mounting flange and to avoid that the time required for the welding is prolonged, and the amount of protruding molten resin is increased.

According to the third feature of the present invention, the second joining member can be supported over the entire joining line by the die on the side of the second joining member, while making up for that a part of each of the inclined portions cannot be supported. In addition, it is possible to ensure that the inclined portions hardly receives a damage from the member such as the fuel rail or the like disposed above the engine mounting flange upon collision of the vehicle.

Further, according to the fourth feature of the present invention, it is possible to avoid the complication of the mold device and to carry out the vibration welding in the mold device having a simple structure as in the prior art.

Although the embodiment of the present invention has been described in detail, it will be understood that the present invention is not limited to the above-described embodiment, and various modifications may be made without departing from the spirit and scope of the invention defined in claims.

What is claimed is:

1. An intake manifold for a vehicle, comprising a plurality of branch pipes each of which is commonly connected at one end thereof to a surge tank and each of which has such a shape that is bent at substantially 90 degrees as a projected figure on a vertical plane, said branch pipes being arranged in parallel to one another in a horizontal direction, and an engine mounting flange which is connected commonly with the other end of each of said branch pipes, wherein a first joining member made of a synthetic resin is integrally provided with said engine mounting flange to constitute a portion of each of the branch pipes, and a second joining member made of a synthetic resin is provided to constitute remaining portions of the branch pipes, said first and second joining members being welded to each other along a joining line which extends in a loop and has inclined portions disposed substantially half around said branch pipes on the side of said other end of each branch pipe in such a manner that they are inclined with respect to a pressing direction for pressing said joining members against each other at the time of welding, wherein among welding margins set in at least one of said first and second joining members along said joining line before welding, a welding margin in said pressing direction for zones corresponding to said inclined portions is set larger than that in said pressing direction for remaining zones excluding said inclined portions of said joining line.

2. An intake manifold for a vehicle according to claim 1, wherein said first joining member has pipe portions which form parts of said branch pipes at locations on the side of said engine mounting flange, and the welding margin in said pressing direction for those zones of said inclined portions of said joining line which are superposed on said pipe portions in said pressing direction, is set larger than that in said remaining zones by an amount of 10 to 25%.

3. An intake manifold for a vehicle according to claims 1 or 2, wherein each of said inclined portions is inclined so that its level is lower as it goes to said engine mounting flange.

4. A process for producing an intake manifold for a vehicle according to claims 1 or 2, comprising the steps of placing said first and second joining members so as to be sandwiched between a first die on the side of said first joining member and a second die on the side of said second joining member, with their portions corresponding to said inclined portions being kept at inner surfaces thereof in non-restrained state, pressing said first and second joining members against each other, and vibration welding said first and second joining members in the pressed state along said joining line.

5. A process for producing an intake manifold for a vehicle according to claim 3, comprising the steps of placing said first and second joining members so as to be sandwiched between a first die on the side of said first joining member and a second die on the side of said second joining member, with their portions corresponding to said inclined portions being kept at inner surfaces thereof in non-restrained state, pressing said first and second joining members against each other, and vibration welding said first and second joining members in the pressed state along said joining line.

* * * * *

UNITED STATES PATENT AND TRADEMARK OFFICE
CERTIFICATE OF CORRECTION

PATENT NO. : 6,532,928 B2
DATED : March 18, 2003
INVENTOR(S) : Ogata

It is certified that error appears in the above-identified patent and that said Letters Patent is hereby corrected as shown below:

Column 8,
Line 45, delete "a" and insert -- α --.
Line 62, delete "LF" and insert -- L' --.
Line 67, delte "O" and insert -- © --.

Column 9, Line 11,
TABLE 3, Line 1, delete "155" and insert -- 200 --.

Signed and Sealed this

Eighth Day of July, 2003

JAMES E. ROGAN
*Director of the United States Patent and Trademark Office*